US011249304B2

United States Patent
Chapman et al.

(10) Patent No.: US 11,249,304 B2
(45) Date of Patent: Feb. 15, 2022

(54) AUGMENTED REALITY CAMERA FRUSTUM

(71) Applicant: Disney Enterprises, Inc., Burbank, CA (US)

(72) Inventors: Steven M. Chapman, Newbury Park, CA (US); Joseph Popp, Cerritos, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 617 days.

(21) Appl. No.: 15/368,398

(22) Filed: Dec. 2, 2016

(65) Prior Publication Data
US 2018/0157047 A1 Jun. 7, 2018

(51) Int. Cl.
G02B 27/00 (2006.01)
G02B 27/01 (2006.01)
G06T 19/00 (2011.01)

(52) U.S. Cl.
CPC ....... G02B 27/0093 (2013.01); G02B 27/017 (2013.01); G06T 19/006 (2013.01); G02B 2027/014 (2013.01); G02B 2027/0138 (2013.01); G02B 2027/0141 (2013.01); G02B 2027/0187 (2013.01)

(58) Field of Classification Search
CPC ... G06T 19/006; G06T 19/00; G02B 27/0093; G02B 27/017; G02B 2027/0138; G02B 2027/014; G02B 27/0141; G02B 2027/0187
USPC ........................................................ 345/633
See application file for complete search history.

(56) References Cited

U.S. PATENT DOCUMENTS

| 2012/0127284 | A1* | 5/2012 | Bar-Zeev | G02B 27/017 348/53 |
| 2015/0116354 | A1* | 4/2015 | Tomlin | G06F 3/04815 345/633 |
| 2016/0035140 | A1* | 2/2016 | Bickerstaff | G06T 19/006 345/633 |
| 2016/0117860 | A1* | 4/2016 | Fei | G06F 3/04815 345/419 |
| 2016/0307374 | A1* | 10/2016 | Kurz | G06T 19/006 |
| 2017/0068328 | A1* | 3/2017 | Bruno | G06F 3/0202 |
| 2017/0109916 | A1* | 4/2017 | Kurz | G06T 11/60 |

(Continued)

OTHER PUBLICATIONS

Ryan Bane, Tobias Höllerer, "Interactive Tools for Virtual X-Ray Vision in Mobile Augmented Reality", Proceedings of the Third IEEE and ACM International Symposium on Mixed and Augmented Reality (ISMAR 2004) 0-7695-2191-6/04 $20.00 ©2004 IEEE.*

(Continued)

*Primary Examiner* — Jin Ge
(74) *Attorney, Agent, or Firm* — Dorsey & Whitney LLP

(57) ABSTRACT

An apparatus such as a head-mounted display (HMD) may have a camera for capturing a visual scene for presentation via the HMD. A user of the apparatus may be operating a second, physical camera for capturing video or still images within the visual scene. The HMD may generate an augmented reality (AR) experience by presenting an AR view frustum representative of the actual view frustum of the physical camera. The field of view of the user viewing the captured visual scene via the AR experience is generally larger that the AR view frustum, allowing the user to avoid unnatural tracking movements and/or hunting for subjects.

23 Claims, 6 Drawing Sheets

(56) References Cited

U.S. PATENT DOCUMENTS

| | | | |
|---|---|---|---|
| 2017/0139474 A1* | 5/2017 | Rochford | G06F 3/012 |
| 2018/0070019 A1* | 3/2018 | Laurent | H04N 5/23206 |
| 2018/0101732 A1* | 4/2018 | Uchiyama | G06K 9/00771 |

OTHER PUBLICATIONS

N. Kishishita, K. Kiyokawa, J. Orlosky, T. Mashita, H. Takemura, E. Kruijff, Analysing the effects of a wide field of view augmented reality display on search performance in divided attention tasks, in: 2014 IEEE International Symposium on Mixed and Augmented Reality (ISMAR), 2014, pp. 177-186.*

* cited by examiner

AUGMENTED REALITY CAMERA FRUSTUM

TECHNICAL FIELD

The present disclosure relates generally to augmented and/or virtual reality presentations.

DESCRIPTION OF THE RELATED ART

Cameras, such as video cameras and still cameras, can be used to capture an image, a series of images, or a video of a physical, real-world scene. Certain devices, by way of an augmented reality (AR) application or functionality, may be configured to insert virtual objects into the captured images or video before and/or while the images or video are displayed.

BRIEF SUMMARY OF THE DISCLOSURE

In accordance with one embodiment, a computer-implemented method, comprises capturing a visual scene with an augmented reality device. The visual scene is augmented with an augmented view frustum associated with a physical camera, wherein the augmented reality view frustum is smaller than a field of view of a user of the augmented reality device. At least one of movement and positioning of the physical camera is tracked. The augmented reality view frustum is at least one of moved and positioned in a manner commensurate with the at least one of the movement and positioning of the physical camera.

In accordance with another embodiment, an apparatus comprises at least one camera adapted to capture a visual scene. The apparatus further comprises an augmented reality component adapted to identify movement and positioning of a physical camera. Further still, the apparatus comprises a display on which an augmented reality experience is presented. The augmented reality experience comprises the captured visual scene and an augmented reality view frustum representative of a view frustum of the physical camera in accordance with the movement and positioning of the physical camera. The augmented reality view frustum is representative of a field of view smaller than a field of view of a user of the apparatus.

In accordance with yet another embodiment, an apparatus comprises a first camera capturing a visual scene, and a second camera communicatively connected to the first camera that captures a subset of the visual scene captured by the first camera. The apparatus further comprises an augmented reality component generating an augmented reality experience. Moreover, the apparatus comprises a display on which the augmented reality experience is presented. The augmented reality experience comprises the visual scene captured by the first camera and an augmented reality view frustum representative of a view frustum of the second camera in accordance with the movement and positioning of the second camera. The augmented reality view frustum is representative of a field of view smaller than a field of view of a user of the apparatus.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Figure 1:
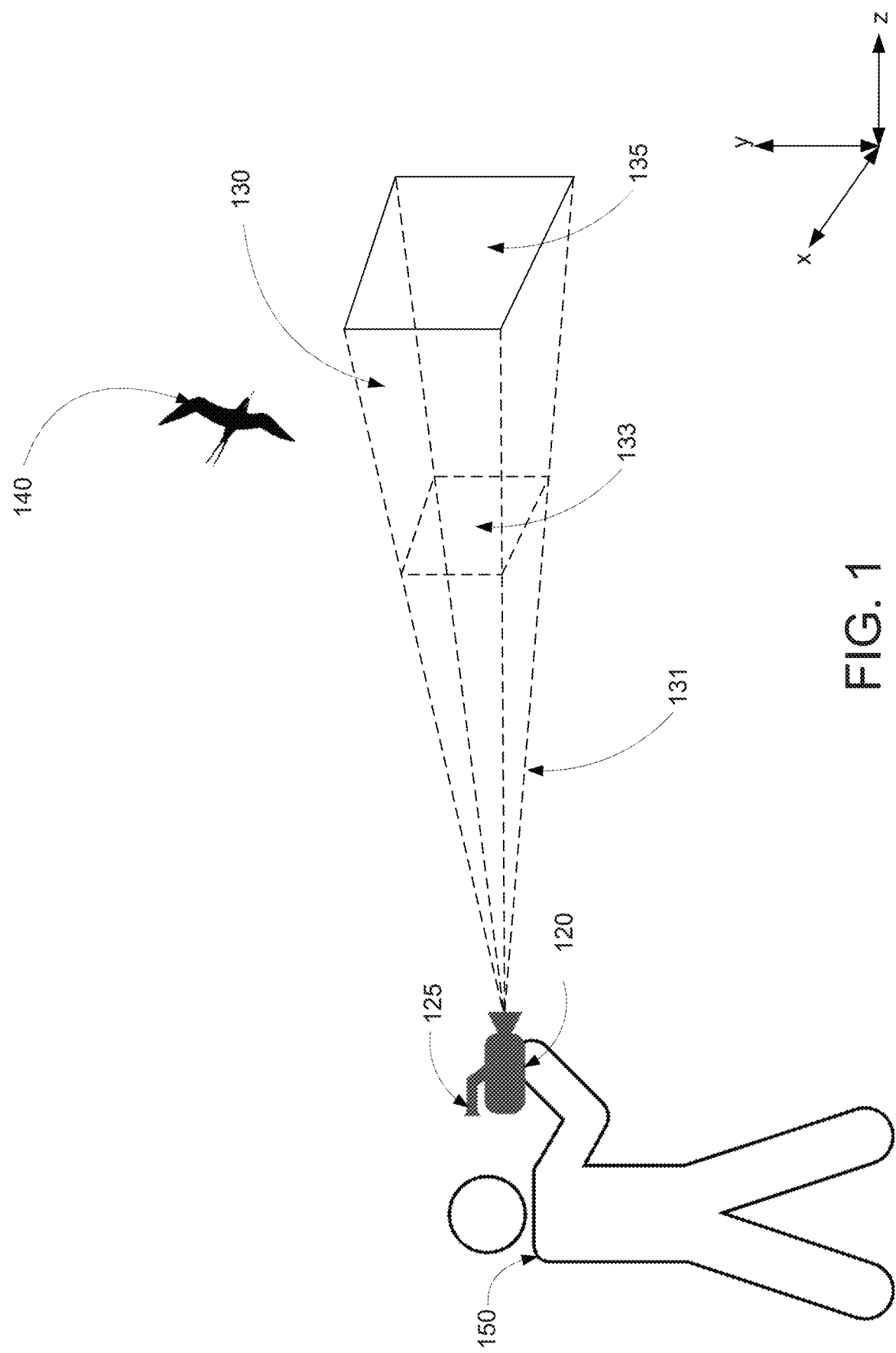
FIG. 1 illustrates an example of a camera view frustum.

A camera's field of view can be defined by a view frustum. FIG. 1 illustrates a user 150 filming or viewing a scene through a viewfinder 125 of a camera 120. The view frustum 130 of camera 120 can be represented by a frustum—a portion of a solid (typically a cone or in this case, a pyramid 131) that lies between one or more parallel planes cutting the solid. In this example, the pyramid 131, whose point can originate at the focal point of a lens (not shown) of camera 120, "grows" outward from the lens. A first parallel plane can be referred to as a near clipping plane 133, and a second parallel plane can be referred to as a far clipping plane 135. The view frustum 130 of camera 120 can be defined as a three-dimensional space between near and far clipping planes 133 and 135 within the boundaries of the pyramid 131.

User 150, looking through viewfinder 125, is unable to see anything, e.g., object 140, that is outside of view frustum 130. When trying to capture a scene or frame a shot in which object 140 is moving, user 150 can experience problems. For example, when shooting video, an unnatural follow movement is reflected/recorded as user 150 attempts to re-compose the scene or shot when object 140 comes into view frustum 130. This can also be problematic in the context of shooting still images with camera 120. In such a scenario, user 150 can miss a shot if user 150 must suddenly attempt to track object 140 if the user was not aware of object 140 (or aware of its location and/or movement) beforehand. Moreover, user 150 may have to "hunt" for a lost object, such as if object 140 quickly moves out of view frustum 130. Such problems are exacerbated when camera 120 has a long zoom lens because the field of view of such lenses can be small. Although computer-controlled camera mounts with dedicated object tracking software are available, such camera mounts are not practical for handheld shooting and/or location shots.

In cases where camera 120 is a smartphone camera or similar device without a conventional viewfinder, user 150 may compose a shot using a display of the smartphone in which camera 120 is implemented. Even under these circumstances, the focus of user 150's eyes would be at some distance from camera 120. Far-off objects could be invisible or difficult to see—due to human vision limitations—and user 150's attempt to refocus his/her eyes to infinity while tracking such objects would be difficult if not impossible. For example, looking at a far-off airplane, user 150 would have to re-focus his/her eyes onto a display, such as smartphone display or a rear display of camera 120, and subsequently hunt for that airplane via the display. Attempting to anticipate the airplane's movement as it intercepts another object (another airplane, the moon, etc.) would be difficult for user 150 if not impossible in normal practice. However, such difficulties are overcome by various embodiments disclosed herein.

According to various embodiments disclosed in the present application, an AR view frustum is implemented in an AR experience such that a user can see or detect objects beyond a camera's view frustum. That is, the view frustum of a physical or real-world camera can be virtualized. For example, the view frustum of a camera 320 (see FIG. 3B) can be represented as an AR view frustum 330. This AR view frustum 330 can be presented through an AR device 300 (which can provide a field of view representative of a field of view from the perspective of a user's eyes). In this example, user 350 is able to see beyond the view frustum of camera 320. Accordingly, the user 350 can be aware of any objects, such as object 340, currently outside the view frustum of camera 320 and re-compose or hone in on object 340 before a shot is started. In situations where object 340 moves outside the view frustum or camera 320, user 350 need not hunt for object 340 because the field of view of user 350 is greater than the view frustum of camera 320 (represented by AR view frustum 330) in an AR experience presented to user 350.

Figure 2:
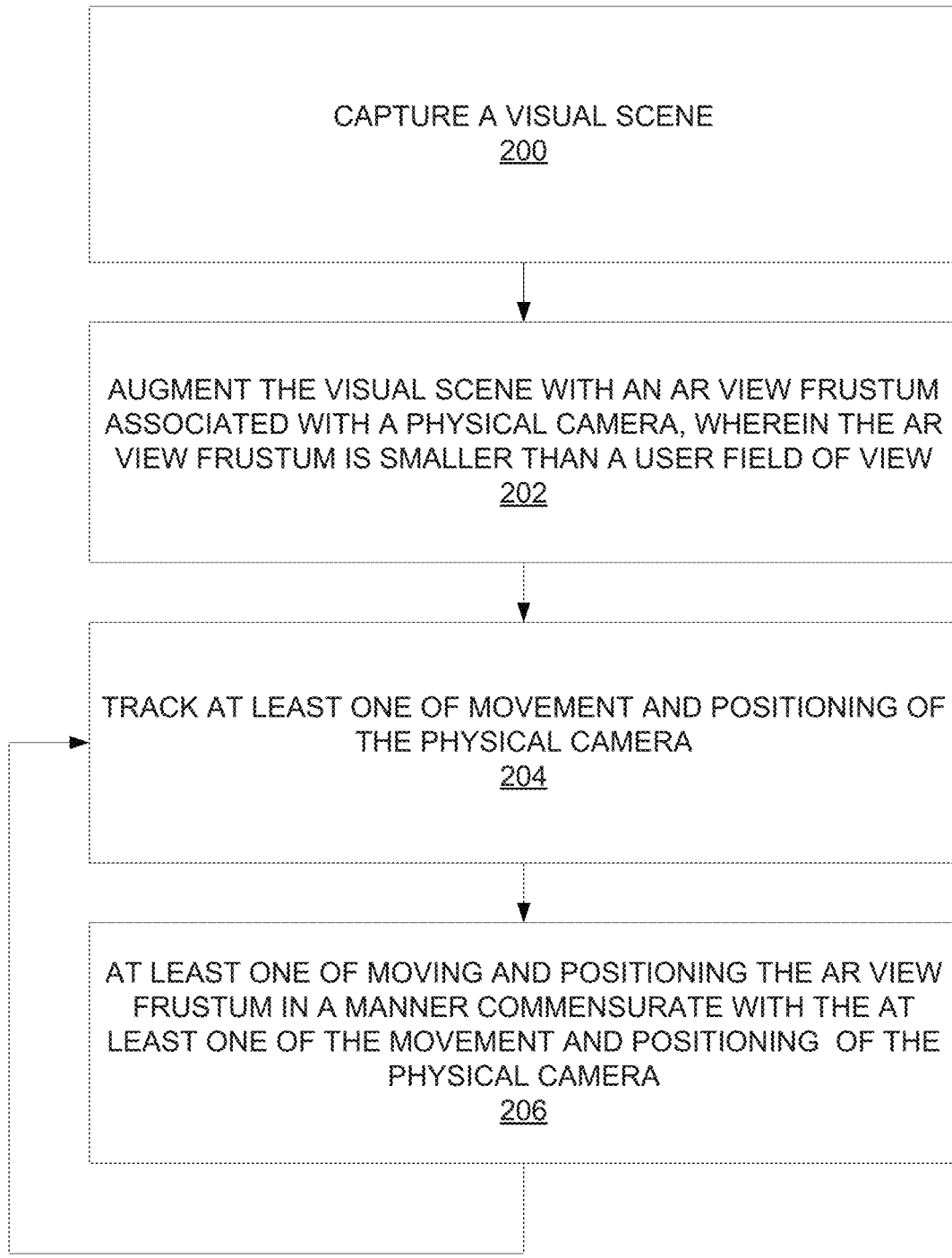
FIG. 2 is an operational flow diagram illustrating an example process for presenting an augmented reality camera frustum in accordance with various embodiments.
Figure 3A:
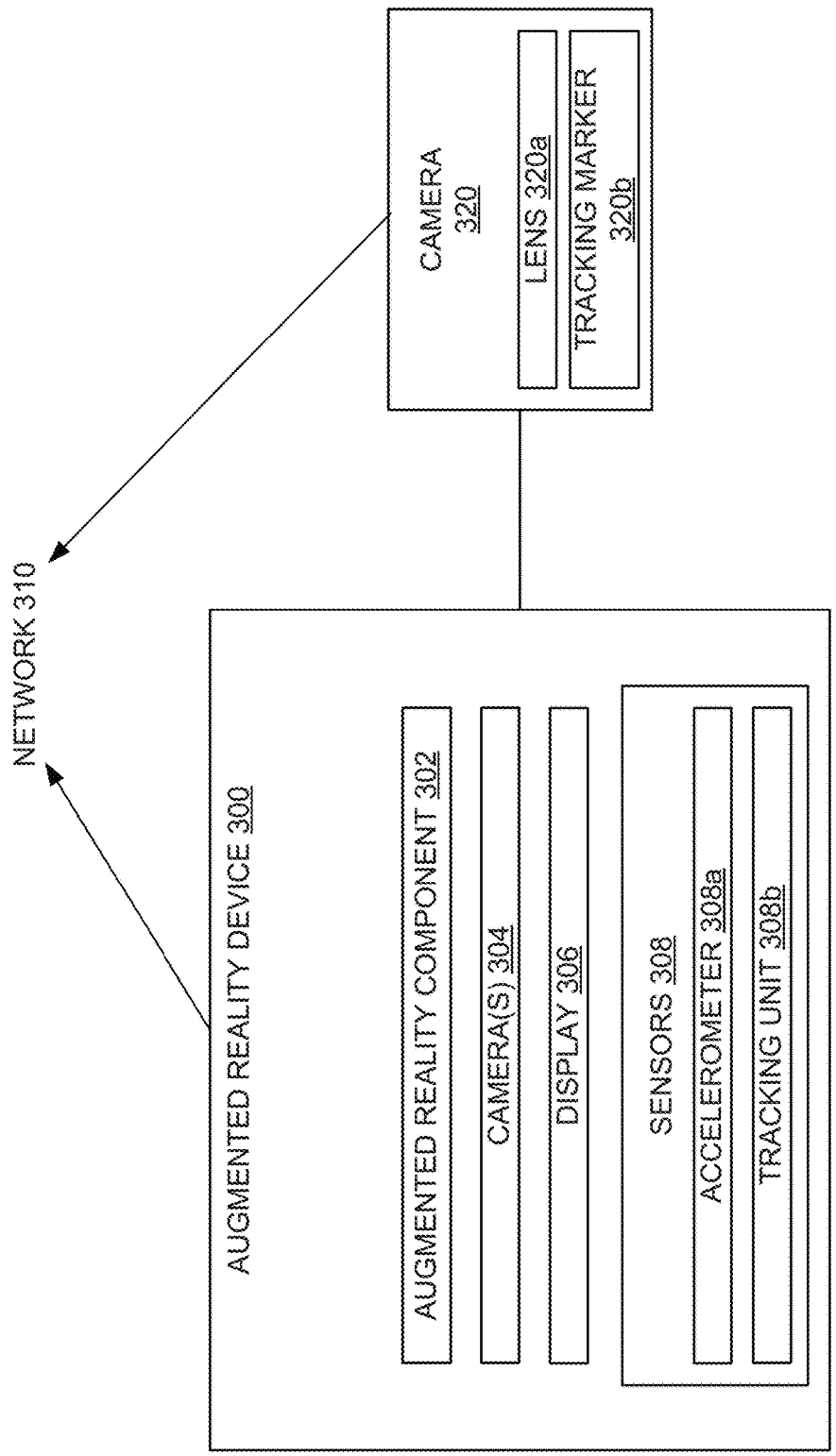
FIG. 3A illustrates an example augmented reality system in accordance with various embodiments.
Figure 3B:
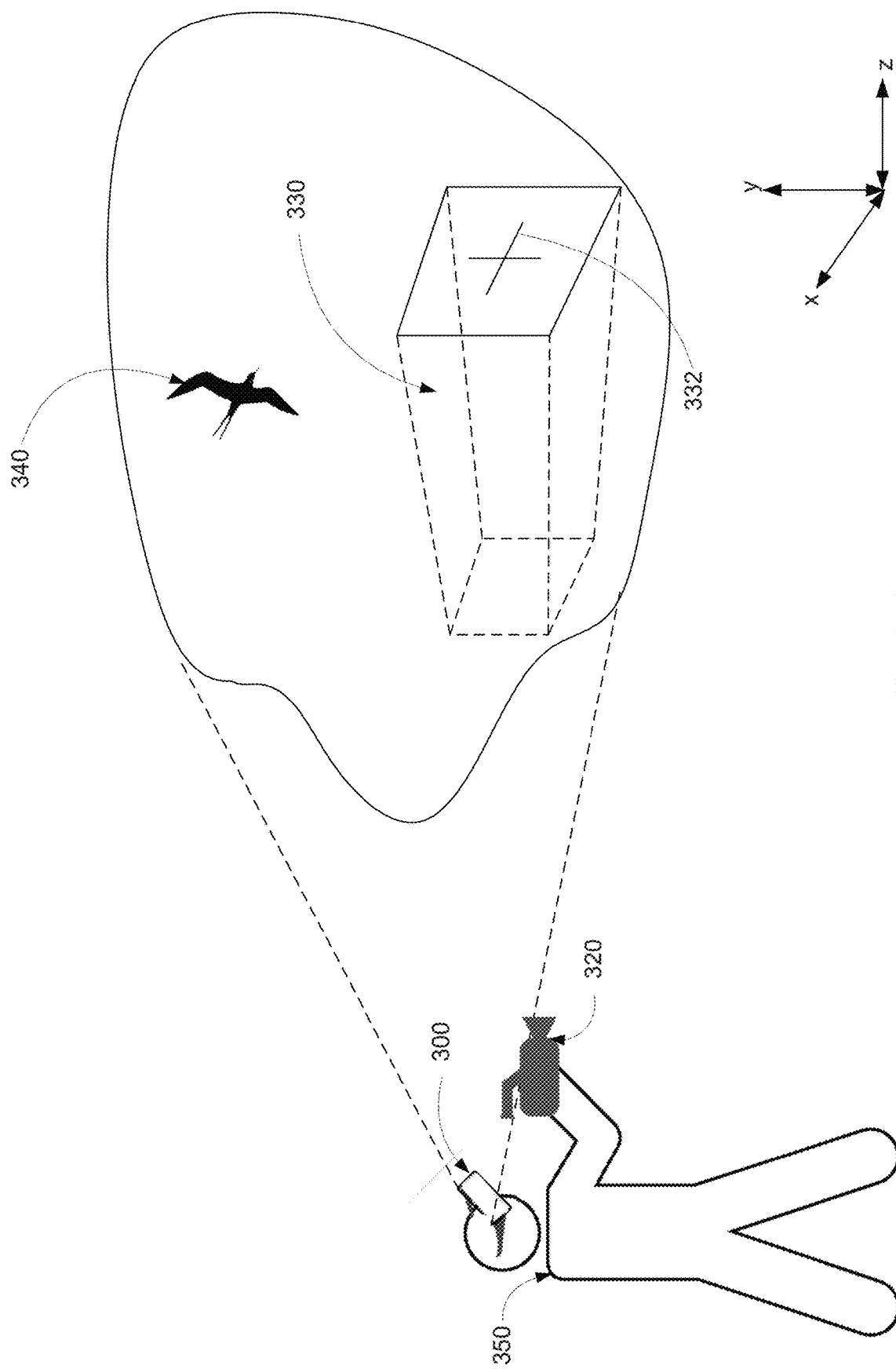
FIGS. 3B and 3C illustrate an example augmented reality experience using an augmented reality camera frustum in accordance with various embodiments.

FIG. 2 illustrates example processes performed in accordance with various embodiments. At operation 200, a visual scene is captured. The visual scene (an example of which is illustrated in FIG. 3B) may be captured by some form of AR device. FIG. 3A is an example representation of such an AR device 300, which may be implemented as solely an AR device, such as a head-mounted display, a see-through display, an optical see-through display, a video see-through display, a visor, glasses, etc. or as part of another user device, such as a laptop PC. As shown, AR device 300 includes an augmented reality component 302, one or more cameras 304, a display 306, and one or more sensors 308, such an accelerometer 308a and a tracking unit 308b.

As used herein, an AR device refers to any device capable of displaying a real-time view of a physical, real-world environment while altering elements within the displayed view of the environment. As such, an AR device displays a view of the real world but augments (e.g., adds or modifies) elements using computer graphics technology. Such an AR device may include and/or be communicatively coupled to a camera device (or multiple camera devices) used to capture a view of the real-world environment and may further include computer software and/or hardware configured to augment elements of the captured scene. When a user looks through or at the AR device, the user sees an augmented view of the physical real-world environment in which the user is located.

The one or more cameras 304 may include cameras for capturing the visual scene. As used herein, a visual scene refers to a view(s) of the real-world environment in which the AR device 300 is being used. For instance, a visual scene may be a series of images of a real-world environment. In the example illustrated in FIG. 3B, the visual scene captured by AR device 300 includes an object 340. Generally, accelerometer 308a is a device capable of measuring the physical acceleration of the AR device 300. AR component 302 may use the accelerometer 308a to determine when the position of AR device 300 is changing, for example, which could indicate that the position of the AR device 300 relative to the visual scene is changing.

AR device 300 may be communicatively connected to a camera 320 (which can be an embodiment of camera 120 of FIG. 1). Camera 320 may include a lens 320a and a tracking marker 320b. AR view frustum 330 can be representative of the view frustum of camera 320 vis-à-vis lens 320a. Tracking marker 320b can be a visual marker, an electronic marker, or other marker that is sensed and monitored by tracking unit 308b of AR device 300. In this way, the movement and positioning (which can include location, and/or orientation) of camera 320 can be monitored by AR device 300. By tracking camera 320, the AR view frustum 330 can be properly represented by AR device 300. That is, AR view frustum 330 can reflect what camera 320 is viewing in the real-world. Camera 320 can be described or referred to herein as a physical camera, which suggests a real-world camera that can be used by user 350 to shoot still or moving media. Although its view frustum may be represented virtually, camera 320 itself is not virtual.

In some embodiments, camera 320 may communicate its movement and/or position through a wireless connection, such as a near-field-communication (NFC) connection, a Bluetooth connection, etc. The wireless connection can be established through a pairing process, by associating camera 320 with AR device 300 (or vice versa) through the use of a QR code, etc. In some embodiments camera 320 may communicate with AR device 300 through a communication device or dongle that can be connected to camera 320 via a hot shoe mount or other port of camera 320.

It should be noted that in some embodiments, camera 320 may be implemented within or as part of AR device 300. For example, AR device 300 may utilize camera 304 to capture a real-world scene used in providing an AR experience, while camera 320 (implemented in AR device 300) may be used to record video or still images of the real-world scene. In this embodiment, tracking unit 308b and tracking marker 320b may be unnecessary because when camera 320 is implemented in or as part of AR device 300, the movement and positioning of camera 320 intrinsically follows that of AR device 300. For example, if camera 320 is located to one side of AR device 300, presentation of AR frustum 300 can be determined with a distance offset from camera 304 and/or display 306. When the positioning of AR device 300 is determined (by AR device 300 on its own or in conjunction with accelerometer 308a), that distance offset can be applied to the position or orientation determined for AR device 300 to determine the position or orientation of camera 320.

In some embodiments, AR device 300 and/or camera 320 may be connected to a network 310. AR device 300 and camera 320 may communicate through network 310. AR device and camera 320 may utilize one or more features provided via network-based services through network 310, such as face detection, network-provided location determination services, etc.

Returning to FIG. 2, at operation 202, AR component 302 is configured to augment the visual scene with an AR view frustum associated with a physical camera (camera 320 of FIG. 3B), wherein the AR view frustum is smaller than a user field of view (as experienced through AR device 300). As previously described, various embodiments improve upon the use of a camera view frustum 130 (see FIG. 1) by representing the camera view frustum 130 as an AR view frustum 330 (see FIG. 3B) in an AR experience.

At operation 204, movement and/or positioning of the physical camera (camera 320 of FIG. 3B) is tracked. As described above, different methods of tracking the movement and/or positioning of camera 320 can be utilized in accordance with various embodiments. Tracking the movement and/or positioning of camera 320 allows AR device 300 to accurately present AR view frustum 330 to user 350 such that AR view frustum 330 reflects what camera 320 is seeing in its actual view frustum in the real world/visual scene captured by AR device 300. That is, at operation 206, the AR view frustum 330 is at least one of moved and positioned commensurate with the at least one of the movement and positioning of the camera 320. Operations 204 and 206 can be repeated as often as necessary while user 350 is using camera 320.

Figure 3C:
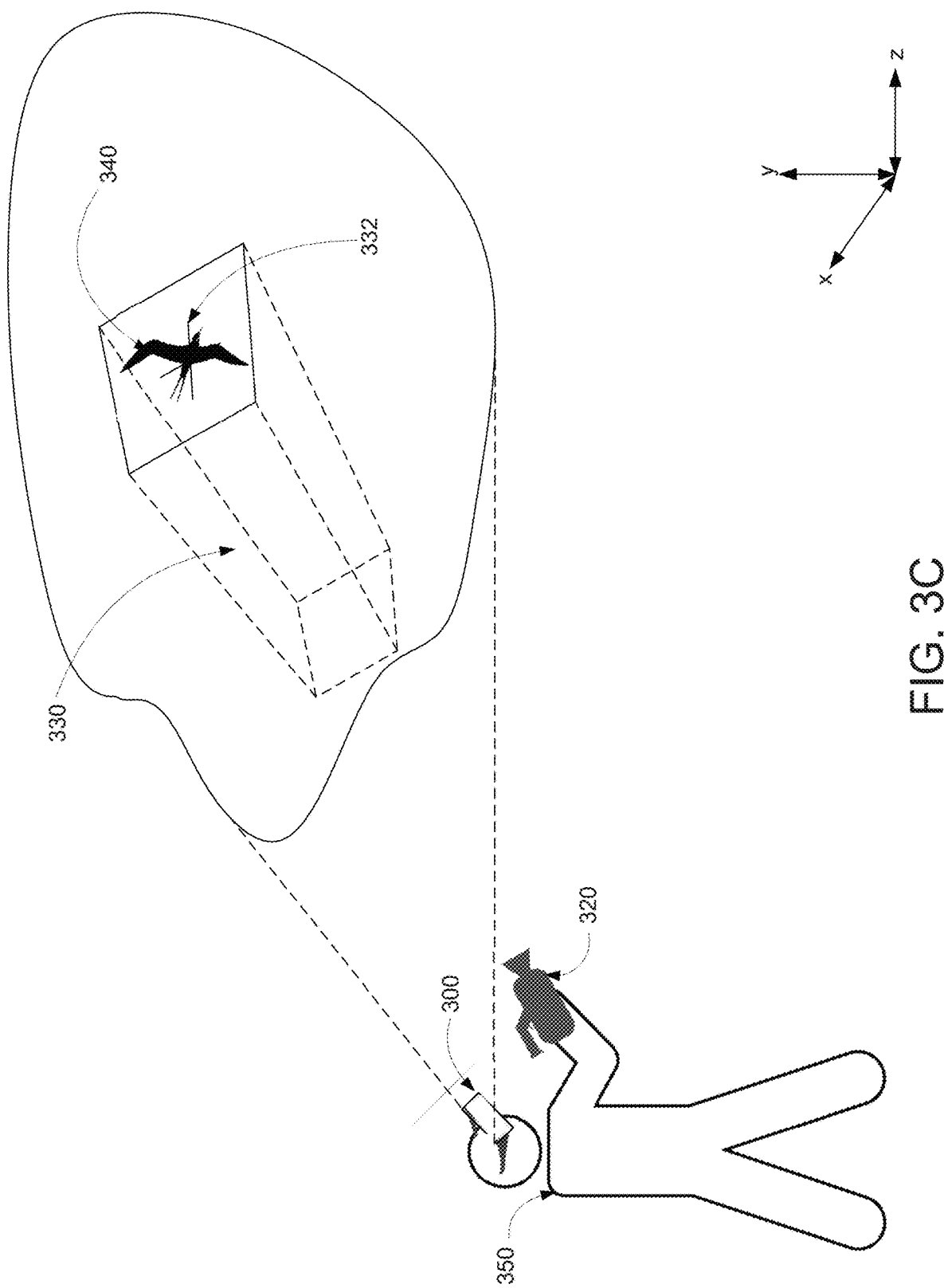

When user 350 is filming the visual scene using camera 320, user 350 views the visual scene through AR device 300. Because AR view frustum 330 is smaller than the field of view of user 350 (represented by AR device 300), user 350 is able to see object 340 coming into the view frustum 330 of camera 320, or see where object 340 is going as it exits or after exiting view frustum 330. In this way, user 350 can re-compose the shot or scene without the conventional, unnatural follow movement and/or without hunting. This is illustrated in FIG. 3C.

It should be noted that AR view frustum 330 can be presented to user 350 with or without a sighting aid, such as reticle 332. Moreover, the representation of AR view frustum 330 on display 306 can take various forms. In some embodiments, AR view frustum 330 may be a three-dimensional representation (as seen in FIGS. 3B and 3C). In some embodiments, AR view frustum 330 may be a two-dimensional rectangle representative of far clipping plane. Other variations are contemplated.

It should be further noted that in some embodiments, camera 304 may utilize two lenses and image sensors. In this embodiment, one lens and image sensor pair can be utilized for a wider angle peripheral view representative of the field of view of user 350. The other lens and image sensor pair can be utilized for a standard view representative of that of camera 320. In some embodiments, a single image sensor may be used, where the single image sensor is partitioned such that it can process images seen by each of the two lenses.

In some embodiments, rather than user 350 manually moving and/or positioning camera 320, camera 320 can be controlled through a remote control mechanism under user 350's control. In some embodiments, camera 320 can be controlled in response to user 350's movement or position. For example, camera 302 can be configured to follow the movement or positioning of the head or eyes of user 350. In this way, camera 302 will track where user 350 is looking. In some embodiments, controlling the movement or positioning of camera 302 can be performed in addition to tracking and moving or positioning camera 302 (as previously discussed). In some embodiments, for example, when camera 302 is implemented in or as part of AR device 300, or when camera 302 is controlled via a remote-controlled gimbal or tracking rig, camera 302 can be moved or positioned based solely on the movement or positioning of user 350.

In some embodiments, one or more features or characteristics of camera 320 are reflected in the AR experience in addition to or as part of AR view frustum 330. Some of these features or characteristics can include, but are not limited to lens aperture, zoom distance, shutter speed, exposure compensation, focus, and white balance. In this way, user 350 can be made aware of certain specifics regarding the view of camera 320 represented by AR device 300. AR device 300 may be configured to allow user 350 to control one or more of the aforementioned features or characteristics of camera 320 through AR device 300 rather than through a camera 320 user interface. For example, user 350 may adjust the zoom distance of the lens of camera 320.

It should be noted that the size of AR view frustum 330 may be set such that it matches the fixed focal length of camera 320's lens (including its crop ratio). Moreover, the sizing of AR view frustum 330 can be coupled to the zooming information of camera 320's lens electronically (when the lens' focal length is variable rather than fixed). For example, camera 320 may provide zoom information via an application programming interface (API) or some other communicable mechanism. At the very least, user 350 can input maximum and minimum zoom ratios that the lens of camera 320 can provide to AR device 300 which can be depicted simultaneously on display 306. In this way, the size of AR view frustum 330 can vary according to camera 320's operating parameters or characteristics.

Depending on the features or characteristics of camera 320, or depending on any adjustments to those features or characteristics, AR view frustum 330 may also change in a manner reflecting those features, characteristics, or adjustments.

Although various embodiments described in the present application relate to cameras, the use of an AR device to present an AR experience that includes an AR view frustum can be used in other contexts as well. For example, an AR view frustum may be utilized to enhance an aiming device or application.

Figure 4:
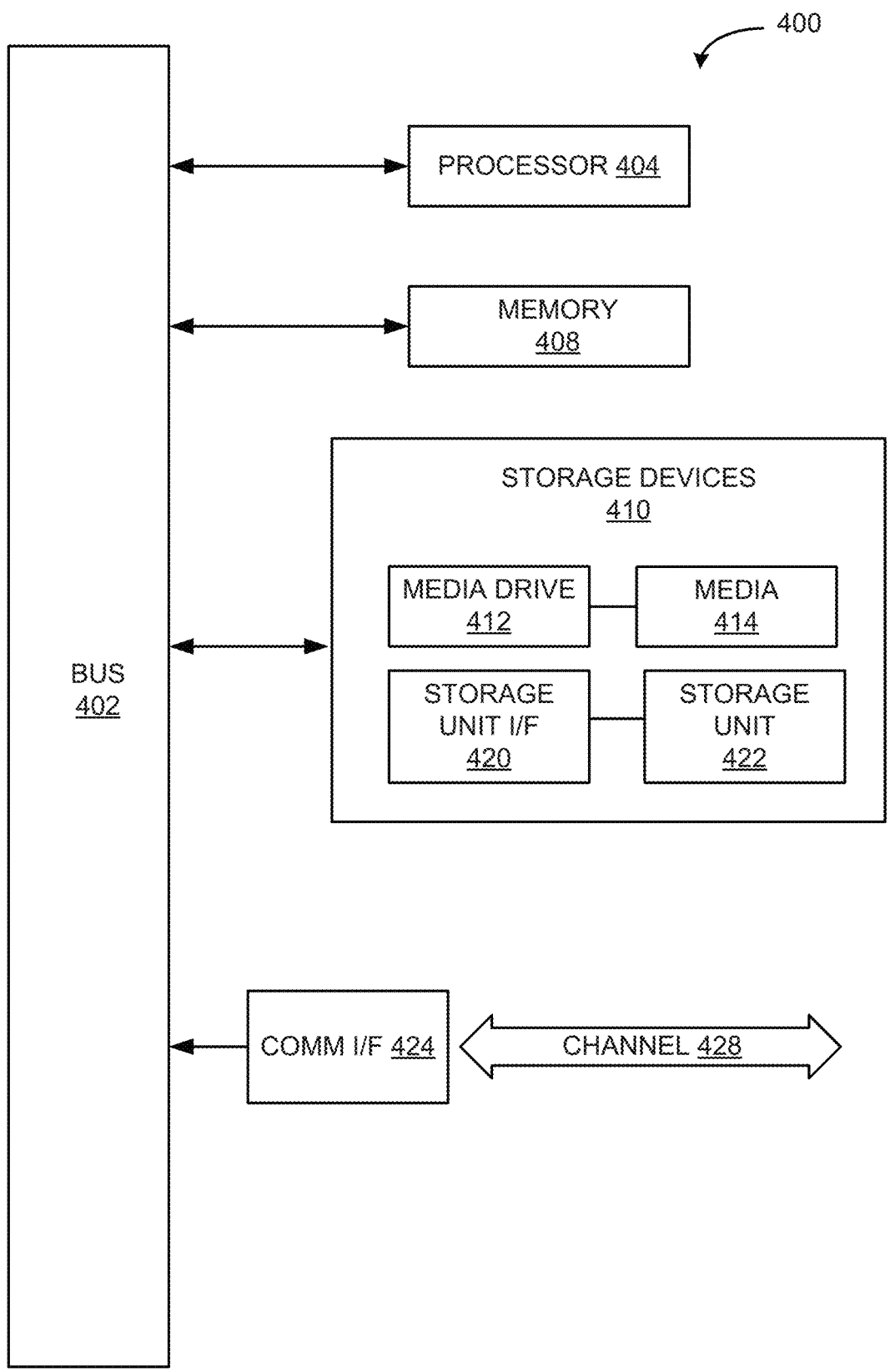
FIG. 4 is an example computing component that may be used to implement various features of embodiments described in the present disclosure.

FIG. 4 illustrates an example computing component that may be used to implement various features of the system and methods disclosed herein, for example, augmented reality device 300, augmented reality component 302, and camera 320.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the application are implemented in whole or in part using software, in one embodiment, these software elements can be implemented to operate with a computing or processing component capable of carrying out the functionality described with respect thereto. One such example computing component is shown in FIG. 4. Various embodiments are described in terms of this example-computing component 400. After reading this description, it will become apparent to a person skilled in the relevant art how to implement the application using other computing components or architectures.

Referring now to FIG. 4, computing component 400 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example navigation systems, portable computing devices, and other electronic devices that might include some form of processing capability.

Computing component 400 might include, for example, one or more processors, controllers, control components, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing component 400 or to communicate externally.

Computing component 400 might also include one or more memory components, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing component 400 might likewise include a read only memory ("ROM") or other static storage device coupled to bus 402 for storing static information and instructions for processor 404.

The computing component 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 414 might include, for example, a hard disk, an integrated circuit assembly, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing component 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory component) and memory slot, a PCMCIA slot and card, and other fixed or removable storage units 422 and interfaces 420 that allow software and data to be transferred from the storage unit 422 to computing component 400.

Computing component 400 might also include a communications interface 424. Communications interface 424 might be used to allow software and data to be transferred between computing component 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the elements or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
   capturing a visual scene with an augmented reality device;
   augmenting the visual scene by presenting an augmented reality view frustum associated with a physical camera, wherein the augmented reality view frustum is smaller than a user field of view of a user of the augmented reality device;
   at least one of moving or positioning the augmented reality view frustum in a manner commensurate with at least one of a movement or positioning of the physical camera; and
   setting a size of the augmented reality view frustum to be commensurate with a focal length of a lens of the physical camera.

2. The computer-implemented method of claim 1, wherein the user field of view is represented in the visual scene.

3. The computer-implemented method of claim 1, further comprising tracking the least one of the movement or positioning of the physical camera by sensing and monitoring a tracking marker associated with the physical camera.

4. The computer-implemented method of claim 1, wherein the visual scene comprises at least one object moving into or out of the augmented reality view frustum.

5. The computer-implemented method of claim 1, further comprising presenting at least one operating characteristic of the physical camera with the augmented reality view frustum.

6. The computer-implemented method of claim 5, further comprising adjusting the at least one operating characteristic of the physical camera via the augmented reality device.

7. The computer-implemented method of claim 5, further comprising adjusting one or more characteristics of the augmented reality view frustum based upon the at least one operating characteristic of the physical camera.

8. The computer-implemented method of claim 1, wherein the at least one of the movement or positioning of the physical camera is further based upon at least one of a movement or positioning of the augmented reality device or the user of the augmented reality device.

9. The computer-implemented method of claim 1, wherein the augmented reality view frustum corresponds to a focal frustum spanning between a near clipping plane of the physical camera and a far clipping plane of the physical camera.

10. The computer-implemented method of claim 5, wherein the at least one operating characteristic of the physical camera comprises one or more of a lens aperture characteristic, a zoom characteristic, a shutter speed, an exposure compensation, a focus characteristic, or a white balance.

11. The computer-implemented method of claim 1, wherein the physical camera is physically separate from the augmented reality device.

12. The computer-implemented method of claim 1, wherein the augmented reality view frustum virtually represents a camera view frustum determined in part by a focal point of the physical camera.

13. An apparatus, comprising:
    at least one camera configured to capture a visual scene;
    an augmented reality component configured to identify at least one of a movement or positioning of a physical camera; and
    a display on which an augmented reality experience is configured to be presented, the augmented reality experience comprising the visual scene and a presented augmented reality view frustum representative of a view frustum of the physical camera in accordance with the at least one of the movement or positioning of the physical camera, the presented augmented reality view frustum being smaller than a user field of view of a user of the apparatus, wherein a size of the presented augmented reality view frustum is commensurate with a focal length of a lens of the physical camera.

14. The apparatus of claim 13, wherein the apparatus is communicatively connected to the physical camera via a wireless or wired connection.

15. The apparatus of claim 13, further comprising at least one sensor configured to monitor the at least one of the movement or positioning of the physical camera and transmit information reflecting the at least one of the movement or positioning of the physical camera to the augmented reality component.

16. The apparatus of claim 15, wherein the at least one sensor is configured to monitor the at least one of the movement or positioning of the physical camera by monitoring a tracking marker associated with the physical camera.

17. The apparatus of claim 13, wherein the display is further configured to display one or more operating parameters of the physical camera in conjunction with the presented augmented reality view frustum.

18. A system, comprising:
    a first physical camera configured to capture a visual scene;
    a second physical camera communicatively connected to the first physical camera and configured to capture a subset of the visual scene captured by the first physical camera;
    an augmented reality component configured to generate an augmented reality experience; and
    a display on which the augmented reality experience is configured to be presented, the augmented reality experience comprising the visual scene captured by the first physical camera and a presented augmented reality view frustum representative of a view frustum of the second physical camera in accordance with at least one of a movement or positioning of the second physical camera, the presented augmented reality view frustum being smaller than a user field of view of a user of the apparatus.

19. The system of claim 18, wherein the second physical camera is co-located with the first physical camera.

20. The system of claim 18, wherein the at least one of the movement or positioning of the second physical camera follows at least one of a movement or positioning of at least one of the augmented reality component or the user.

21. The system of claim 18, wherein the second physical camera is remotely located from the first physical camera.

22. The system of claim 18, further comprising at least one sensor configured to track the at least one of the movement or positioning of the second physical camera.

23. The system of claim 18, wherein the augmented reality component is configured to present the presented augmented reality view frustum in conjunction with at least one operating parameter of the second physical camera.

* * * * *